United States Patent
Jiang et al.

(10) Patent No.: US 9,146,778 B2
(45) Date of Patent: *Sep. 29, 2015

(54) MANAGEMENT OF BACKGROUND TASKS

(71) Applicant: Microsoft Corporation, Redmond, WA (US)

(72) Inventors: Rachel Jiang, Redmond, WA (US); Rhon Manlapaz, Bellevue, WA (US); Megan Donahue, Seattle, WA (US); Dawn Wilson, Bellevue, WA (US); Darin Miller, Sammamish, WA (US); Michael Saffitz, Seattle, WA (US); Kenneth Lynn Crocker, Sammamish, WA (US); Kevin Shields, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,339

(22) Filed: Aug. 21, 2014

(65) Prior Publication Data

US 2014/0366031 A1    Dec. 11, 2014

Related U.S. Application Data

(63) Continuation of application No. 13/212,791, filed on Aug. 18, 2011, now Pat. No. 8,886,976.

(60) Provisional application No. 61/474,225, filed on Apr. 11, 2011.

(51) Int. Cl.
  *G06F 1/32* (2006.01)
  *G06F 9/48* (2006.01)

(52) U.S. Cl.
  CPC ............ *G06F 9/4843* (2013.01); *G06F 9/4893* (2013.01); *Y02B 60/144* (2013.01)

(58) Field of Classification Search
  None
  See application file for complete search history.

(56) References Cited

U.S. PATENT DOCUMENTS 5,297,032 A    3/1994   Trojan et al.
5,321,750 A    6/1994   Nadan
(Continued)

FOREIGN PATENT DOCUMENTS

WO    WO 99/26127    5/1999

OTHER PUBLICATIONS

Banerjee et al., "Users and Batteries: Interactions and Adaptive Energy Management in Mobile Systems," In Proceedings of Ubicomp '07, pp. 217-237 (Sep. 2007).
(Continued)

*Primary Examiner* — Paul Yanchus, III
(74) *Attorney, Agent, or Firm* — John Jardine; Kate Drakos; Micky Minhas

(57) ABSTRACT

Background tasks are managed through background task settings that allow or prevent the execution of agents associated with mobile device applications in the background of a mobile computing device. Background task management can extend the battery life of a mobile device and can be done by a user, the mobile device or a combination thereof. Agents scheduled for execution by a mobile device are executed according to the background task settings associated with the application. Background task settings can be controlled via background task control panels. Background task settings can be set on a system-wide, application or background task basis. Disabled background tasks can be enabled when the application is next launched. A user can be invited to navigate to the background task control panels when various events occur such as the battery life dropping below a threshold or the current power consumption exceeding a threshold.

20 Claims, 9 Drawing Sheets

(56) References Cited

U.S. PATENT DOCUMENTS

| | | | |
|---|---|---|---|
| 5,339,392 | A | 8/1994 | Risberg et al. |
| 5,542,088 | A | 7/1996 | Jennings et al. |
| 5,819,284 | A | 10/1998 | Farber et al. |
| 5,959,621 | A | 9/1999 | Nawaz et al. |
| 6,188,405 | B1 | 2/2001 | Czerwinski et al. |
| 6,216,141 | B1 | 4/2001 | Straub et al. |
| 6,278,448 | B1 | 8/2001 | Brown et al. |
| 6,311,058 | B1 | 10/2001 | Wecker et al. |
| 6,449,638 | B1 | 9/2002 | Wecker et al. |
| 6,456,334 | B1 | 9/2002 | Duhault |
| 6,510,553 | B1 | 1/2003 | Hazra |
| 6,539,476 | B1 | 3/2003 | Marianetti et al. |
| 6,724,403 | B1 | 4/2004 | Santoro et al. |
| 6,832,355 | B1 | 12/2004 | Duperrouzel et al. |
| 6,976,210 | B1 | 12/2005 | Silva et al. |
| 7,028,264 | B2 | 4/2006 | Santoro et al. |
| 7,376,907 | B2 | 5/2008 | Santoro et al. |
| 7,912,448 | B2 | 3/2011 | Hinrikus et al. |
| 7,933,632 | B2 | 4/2011 | Flynt et al. |
| 7,987,431 | B2 | 7/2011 | Santoro et al. |
| 8,886,976 | B2 * | 11/2014 | Jiang et al. .................. 713/320 |
| 2005/0108075 | A1 | 5/2005 | Douglis et al. |
| 2005/0125701 | A1 | 6/2005 | Hensbergen et al. |
| 2006/0190833 | A1 | 8/2006 | SanGiovanni et al. |
| 2008/0022279 | A1 | 1/2008 | Jung |
| 2008/0141049 | A1 | 6/2008 | Hassan et al. |
| 2009/0325563 | A1 | 12/2009 | Horodezky et al. |
| 2010/0017637 | A1 | 1/2010 | Rosay |
| 2010/0066698 | A1 | 3/2010 | Seo |
| 2010/0145643 | A1 | 6/2010 | Katpelly et al. |
| 2011/0225547 | A1 | 9/2011 | Fong et al. |

OTHER PUBLICATIONS

International Search Report and Written Opinion, corresponding Application No. PCT/US2012/032949, 8 pages, Jul. 31, 2013.

Supplemental European Search Report, corresponding Application No. EP 12863801.2, 3 pages, Jul. 31, 2014.

Quintana, "Mobile Multitasking," http://davidquintana.com/entry/mobile-multitasking/, retrieved on Jul. 17, 2014, 6 pages.

Kendrick, "How to Stretch Battery Life on the HTC EVO 4G," http://gigaom.com/2010/06/10/how-to-stretch-battery-life-on-the-htc-evo-4g/, retrieved on Jul. 17, 2014, 4 pages.

Examination Report issued in corresponding Application No. EP 12863801.2, dated Aug. 12, 2014, 5 pages.

* cited by examiner

MANAGEMENT OF BACKGROUND TASKS

CROSS REFERENCE TO RELATED APPLICATION

This application is a continuation of U.S. patent application Ser. No. 13/212,791, filed on Aug. 18, 2011, which claims priority to and the benefit of U.S. Provisional Application No. 61/474,225, filed Apr. 11, 2011, both of which are incorporated herein by reference.

BACKGROUND

Mobile computing devices capable of multitasking allow for rich user experiences. For example, a mobile device user can listen to a song while simultaneously surfing the web and having the mobile device periodically check for new email messages while the user interacts with other applications. Tasks performed in the background consume mobile device power and thus decrease battery life, and can operate without a user's knowledge or without the user knowing what operations are being performed by the background tasks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools described herein allow for the management of background tasks on multitasking mobile computing devices. Background task management can extend battery life and allows users to turn off background tasks that the user does not wish the device to perform.

In one embodiment, a multitasking mobile computing device notifies a user that an application is capable of scheduling agents that are executed when the application is operating in the background. A user can disable background agents via background task control panels, which allow background tasks to be disabled on a system-wide, application or background task basis. The control panels can provide descriptions of the background tasks to aid the user in deciding which background agents, if any, are to be disabled. If background tasks for an application are disabled, the application can schedule agents again when the application is next operating in the foreground. When the application moves back into the background, any scheduled background agents are disabled.

In another embodiment, a mobile computing device invite a user to navigate to a background task control panel to disable background tasks when the battery life drops below a threshold, the number of scheduled agents exceeds a threshold, or other operational thresholds are crossed or device conditions are met. Alternatively, the device can automatically turn off or turn on background tasks in response to these events.

The foregoing and other objects, features, and advantages of the invention will become more apparent from the following detailed description, which proceeds with reference to the accompanying figures.

DETAILED DESCRIPTION

The methods and tools described herein can be used to manage background tasks on a multitasking mobile computing device. For example, according to the technologies described herein, after downloading a social networking application to a smartphone and launching the application for the first time, a user can be presented with a message that the application is capable of performing background tasks and that there is a setting to manage execution of these background tasks. The user can tap on a settings link in the message and can be presented with a list of applications. The user can tap on each application to learn about the functionalities that each application is capable of performing while running in the background. The user can determine that he or she does not wish one of the applications to run in the background and disables that application's background tasks, thus reducing power consumption of the smartphone and extending battery life.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Figure 1:
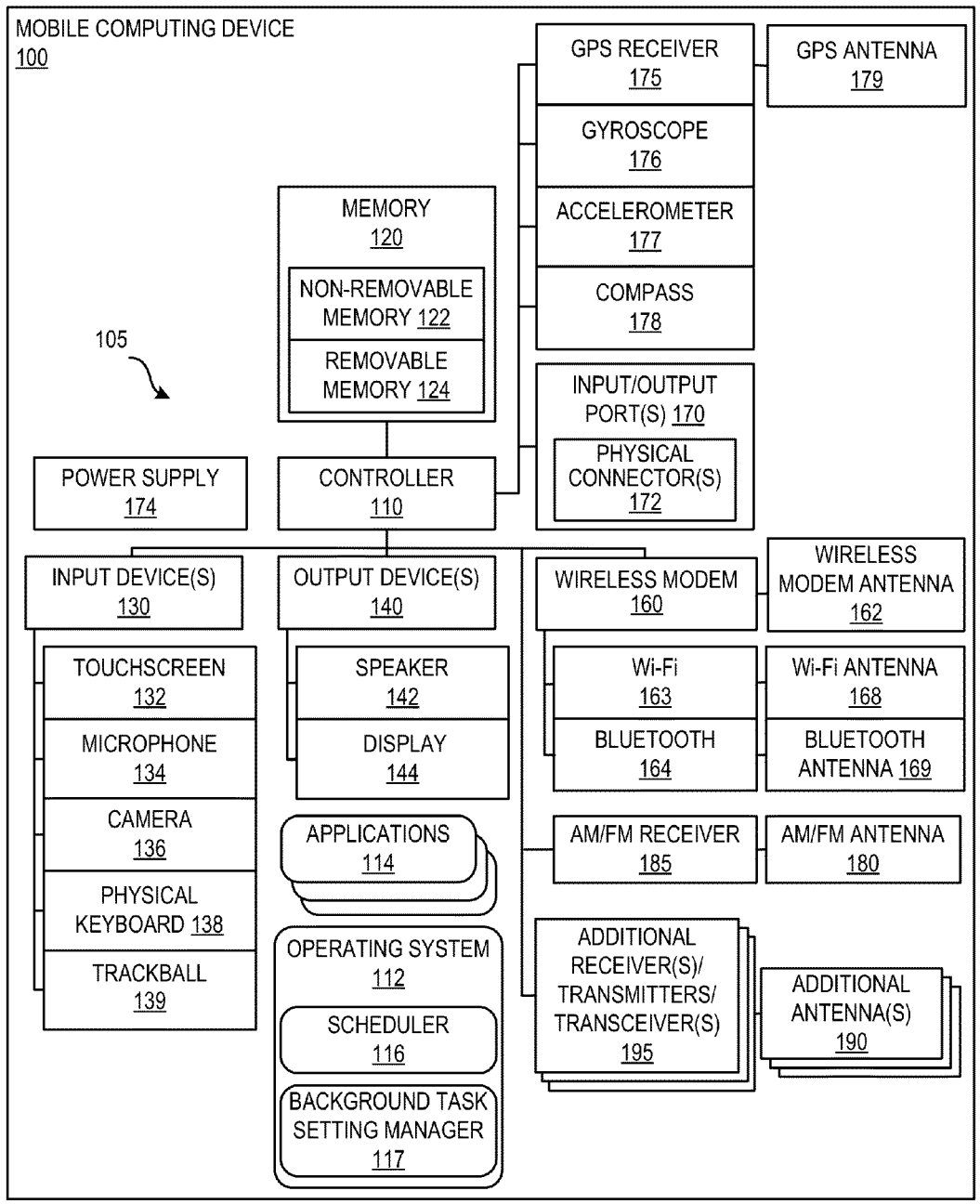
FIG. 1 is a system diagram depicting an exemplary mobile computing device that can be used to perform any of the methods described herein.
Figure 1:
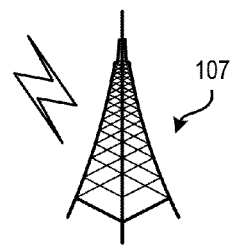

FIG. 1 is a system diagram depicting an exemplary mobile computing device 100 that can be used to perform any of the methods described herein. The mobile computing device 100 can include a variety of optional hardware and software components 105. Generally, components 105 can communicate with other components, although not all connections are shown, for ease of illustration. The mobile computing device 100 can be any of a variety of computing devices (e.g., cell phone, smartphone, handheld computer, netbook, tablet computer, slate device, Personal Digital Assistant (PDA), etc.) and can allow wireless two-way communications with one or more mobile communication networks 107, such as a cellular or satellite network.

The computing device 100 can include a controller or processor 110 (e.g., signal processor, graphics processing unit (GPU), microprocessor, ASIC, or other control and processing logic circuitry or software) for performing such tasks as signal coding, graphics processing, data processing, input/output processing, power control, and/or other functions. An operating system 112 can control the allocation and usage of the components 105 and support for one or more application programs 114. The application programs 114 can include common mobile computing applications (e.g., email applications, calendars, contact managers, web browsers, messaging applications) as well as other computing applications.

The operating system 112 can comprise a scheduler 116 and a background task settings manager 117. The scheduler 116 contains a list of agents that the mobile computing device is to execute and information indicating when the agents are to be executed. The background task settings manager 117 is responsible for performing tasks related to the management of background tasks such as presenting background task settings control panels at a mobile computing device display; setting background task settings in response to user input received at the control panels; and removing, adding or modifying scheduled agents in response to a change in background task settings, an application being closed or an application being moved between the foreground and the background.

The mobile computing device 100 can include memory 120. Memory 120 can include non-removable memory 122 and removable memory 124. The non-removable, or embedded memory, 122 can include RAM, ROM, flash memory, a hard drive, or other well-known memory storage technologies. The removable memory 124 can include flash memory cards (e.g., SD (Secure Digital) cards), memory sticks, a Subscriber Identity Module (SIM) card, which is well known in GSM (Global System for Mobile Communication) systems, or other well-known memory storage technologies, such as "smart cards." The memory 120 can be used for storing data and/or computer-executable instructions for running the operating system 112 and the application programs 114 on the device 100. Example data can include web pages, text, images, sound files, video data or other data sets to be sent to and/or received from one or more network servers or other devices by the mobile computing device 100 via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile computing device 100 can also have access to external memory (not shown).

The computing device 100 can support one or more input devices 130, such as a touch screen 132, microphone 134, camera 136, physical keyboard 138 and/or trackball 139 and one or more output devices 140, such as a speaker 142 and a display 144. Other possible output devices (not shown) can include piezoelectric or other haptic output devices. Any of the input devices 130 and output devices 140 can be internal to, external to, or removably attachable with the computing device 100. External input and output devices 130 and 140 can communicate with the computing device 100 via a wired or wireless connection. Some devices can serve more than one input/output function. For example, touchscreen 132 and display 144 can be combined in a single input/output device.

The computing device 100 can provide one or more natural user interfaces. For example, the operating system 112 or applications 114 can comprise speech-recognition software as part of a voice user interface that allows the device 100 to respond to voice commands. Further, the device 100 can comprise an input device and software that allows the device 100 to respond to spatial gestures made by a user. For example, a user's spatial gestures can be detected and interpreted to provide input to a mobile computing device gaming application.

A wireless modem 160 can be coupled to a wireless modem antenna 162 and can support two-way communications between the mobile computing device 100 and external devices, as is well understood in the art. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as a GSM network for data and voice communications within a single cellular network, between cellular networks, or between the mobile computing device and a public switched telephone network (PSTN).

The mobile computing device 100 can further include at least one input/output port 170 (which can be, for example, a USB port, IEEE 1394 (FireWire) port, and/or RS-232 port) comprising physical connectors 172, a power supply 174, a satellite navigation system receiver such as a GPS receiver 175, a gyroscope 176, an accelerometer 177 and a compass 178. The GPS receiver 175 can be coupled to a GPS antenna 179. The mobile computing device 100 can additionally include an AM/FM antenna 180 coupled to an AM/FM receiver 185 for receiving radio signals broadcast by an AM/FM radio signal transmitter. The mobile computing device 100 can further include one or more additional antennas 190 coupled to one or more additional receivers, transmitters and/or transceivers 195 to enable various additional functions. For example, mobile computing device 100 can include an additional antenna 190 coupled to an additional receiver 195 configured to receive and process a digital audio radio service (DARS) signal for output at the mobile computing device 100 or an attached accessory. The illustrated components 105 are not required or all-inclusive, as any components can be deleted and other components can be added.

Figure 2:
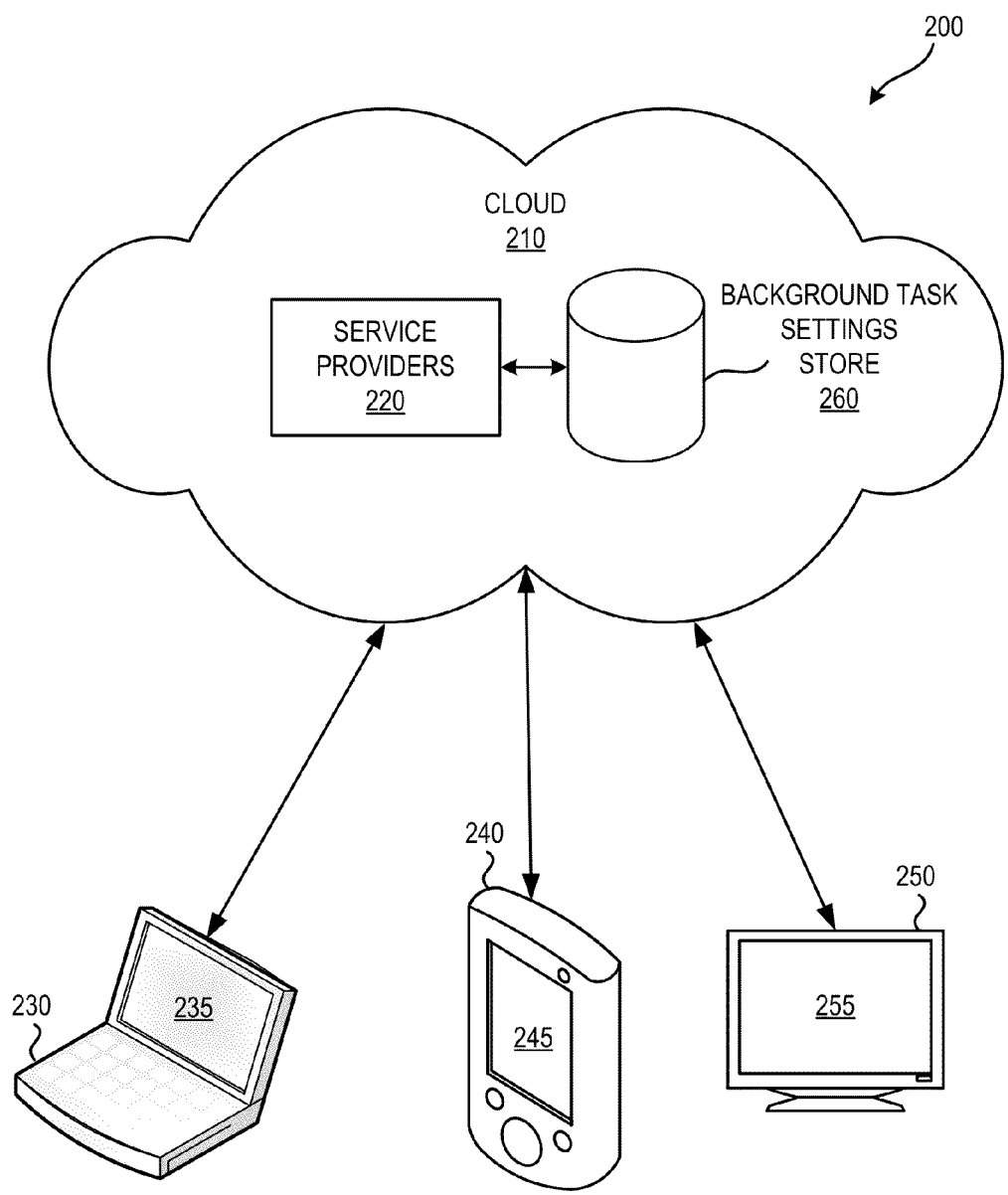
FIG. 2 illustrates a generalized example of a suitable implementation environment in which described embodiments, techniques, and technologies may be implemented.

FIG. 2 illustrates a generalized example of a suitable implementation environment 200 in which described embodiments, techniques, and technologies may be implemented.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., processing user input and presenting a user interface) can be performed on local computing devices (e.g., connected devices 230, 240, 250) while other tasks (e.g., storage of data to be used in subsequent processing) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a desktop, laptop, notebook, netbook or tablet computer or the like. Connected device 240 represents a mobile computing device with a mobile computing device screen 245 (e.g., a small-size screen). For example, connected device 240 could be a mobile phone, smartphone, personal digital assistant or the like. Connected device 250 represents a device with a large screen 255. For example, connected device 250 could be a television with Internet connectivity, or a television connected to another device capable of connecting to the cloud such as a set-top box, gaming console or the like. One or more of the connected devices 230, 240, 250 can include touch screen capabilities. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, email, Short Message Service (SMS), Multimedia Message Service (MMS), social networking and website hosting. The service providers can host online marketplaces offering wide varieties of goods and services such as software applications and upgrades and media content which can be obtained by users with or without purchase and for download from the cloud or delivery through postal mail. For example, a smartphone can connect with an online marketplace to purchase applications for download and installation.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

In addition, any of the background task settings described herein can be stored in a background task settings store 260 accessible to any of the service providers 220, thereby allowing a user to maintain a consistent background task settings profile across mobile computing devices. Thus, background task settings are not necessarily tied to a specific mobile device.

A mobile computing device can have one or more software applications stored in memory. A mobile computing device begins executing an application when, for example, the application is launched by a user or another application. For example, a user can launch an application by tapping on an application icon or tile from among multiple application icons or tiles presented in a mobile computing device display. A first application can launch a second application to utilize capabilities of the second application to carry out a function (e.g., a multimedia messaging service (MMS) application can launch an application having image browser capabilities to allow a user to select an image for inclusion in an MMS message.)

Any of the mobile devices described herein are capable of multitasking, wherein more than one application is active simultaneously. As used herein, an active application refers to an application being executed by the mobile computing device. That is, an active application refers to an application that has been opened or launched by a user (or another application). Active applications include applications whose agents are being executed by or are scheduled to be executed by the mobile computing device.

An active application can operate in the foreground (a foreground application) or the background (a background application) of the mobile computing device. A foreground application is characterized as the application currently selected to receive user input and can occupy all or only a portion of the mobile device display. That is, the foreground application is the application associated with graphical user interface components that are the current focus on the mobile computing device. Generally, only one application operates in the foreground of the mobile device at any given time, with the remainder of the active applications operating in the background. A foreground application is pushed to the background (i.e., the foreground application becomes a background application) in response to another application being launched (i.e., an inactive application becoming an active application) or another application being brought to the foreground (i.e., a background application becoming a foreground application).

An application executing in the foreground of a mobile computing device can schedule one or more agents for execution by the mobile device. In some embodiments, scheduling agents for execution comprises adding agents to a scheduler. Agents can be scheduled to be performed on a periodic, one-off, asynchronous or any other basis. The tasks performed by agents can be any task that an application is capable of performing while in the foreground. For example, an agent can be scheduled to play a song or collection of songs, or be scheduled to periodically perform push and pull operations to send and retrieve email messages to/from an email server. Agents can also be configured to execute when certain conditions exist, such as when the device is connected to any network or a specific network connection. For example, agents can be configured to operate when the device is connected to a 4G or Wi-Fi network. In another example, a social network application that discovers deals for retailers or restaurants located within the user's vicinity can operate if the device determines that it is located in an urban setting or away from the device user's home.

When the focus of a mobile computing device shifts from a first application to a second application (i.e., the first application moves from the foreground to the background) execution of the first application ceases, but agents scheduled by the first application while the first application was in the foreground can still be allowed to execute. Thus, an agent can be considered either a foreground agent or a background agent, depending on whether the associated application is operating as a foreground application or a background application. Although agents generally perform one or more specific application tasks, in some embodiments, agents can exercise all or any portion of an application's full functionality. For example, applications that periodically back up data stored on a mobile device or applications that perform batch processing of videos or images or other computationally expensive tasks can perform all or a portion of their functionality when operating in the background. Although background agents are generally considered to perform background tasks, the phrases "background agents" and "background tasks" are used interchangeably herein. If a foreground application is made inactive (e.g., closed by the user), agents that were scheduled by the application are unscheduled. For example, any agents added to a scheduler while an application was operating in the foreground are removed from the scheduler when the application is closed.

These concepts can be better understood with reference to an example. Consider a user operating a smartphone on which media player and web browser applications are stored. The user launches the media player application by tapping on a media player icon or tile presented at the device display. In response, the mobile computing device begins executing the media player in the foreground; a media player graphical user interface appears in the device display and the media player application is ready to accept user input. The user selects a song to be played, and the media player schedules an agent for immediate execution to play the selected song. After listening to a few verses of the song, the user desires to learn more information about the artist and launches the web browser application. A web browser user interface appears in the display and the web browser becomes the foreground application. The media player application is pushed to the background. Execution of the media player application is halted except for the media player application agent, now operating as a background agent, which is playing the selected song. Thus, the song continues to play even though the media player application is now running in the background.

The tools and methods described herein provide for the management of background tasks that can execute on a multitasking mobile computing device. The execution of agents or tasks in the background of a mobile device can be selectively allowed or prevented. In addition, notifying a user that applications downloaded onto a mobile computing device are capable of performing background tasks can be useful in its own right. A user may think that whenever a new application is launched, the previously executing application ceases to operate entirely, and may not be aware that agents scheduled by the application may operate after application is moved to the background. Further, the user may not know what the background tasks are doing. For example, the user may not be aware that a social networking application executing on a GPS-enabled mobile device is providing the user's location to the social networking service's cloud-based servers as part of the application periodically "checking-in," and that the application continues to periodically check-in even though another application is operating in the foreground. Thus, the methods and tools described herein allow a user to become aware of what background tasks are being performed and what information they are sharing with the cloud, and to allow or prevent execution of specific background tasks accordingly.

Although the methods and tools described herein are discussed generally in the context of mobile computing devices, they can be used for the user managing background tasks for applications that run on any computing device, including non-mobile devices described herein (e.g., desktop personal computers, servers).

Figure 3:
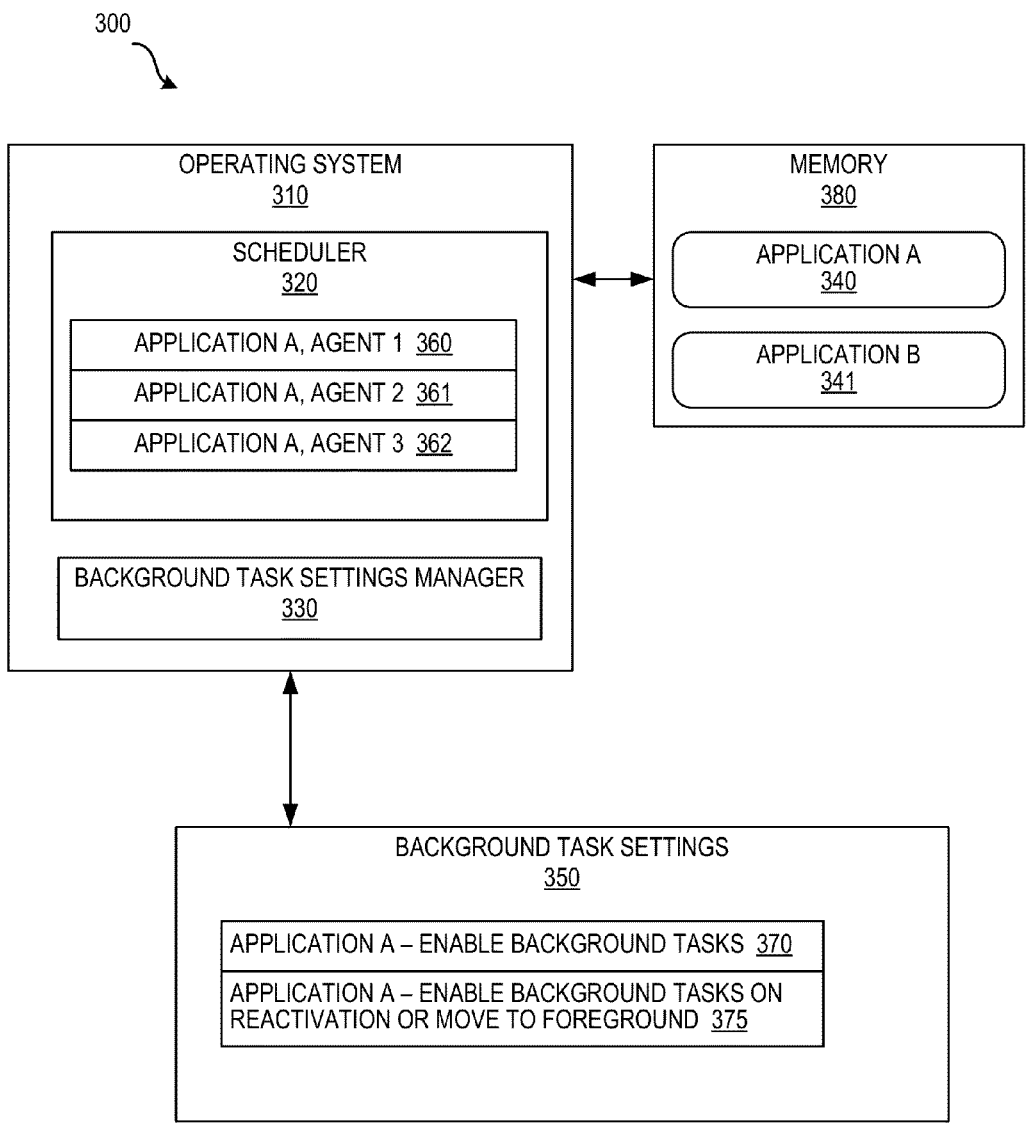
FIG. 3 is a block diagram of an exemplary system 300 capable of managing background tasks in a multitasking mobile device

FIG. 3 is a block diagram of an exemplary system 300 capable of managing background tasks in a multitasking mobile device. The system 300 comprises an operating system 310 communicating with a background task settings store 350. The operating system 310 comprises a scheduler 320 and a background task settings manager 330. The operating system is capable of executing applications A and B 340-341 stored in local memory 380.

Background tasks can be managed via background task settings. For example, the store 350 can contain background task settings for applications A and B. Each mobile computing device application can have one or more background task settings that allow (enable, turn on, etc.) or prevent (disable, turn off, etc.) the background execution of agents scheduled by the application. Preventing the execution of background agents can comprise preventing background agents from being scheduled, suspending currently scheduled background agents or unscheduling (removing) background agents from the scheduler. The background task settings associated with an application can be associated with multiple agents capable of being scheduled by an application, individual agents or groups of agents (i.e., a set of individual agents having a common trait such as agent type, e.g., pushing and pulling messages to/from a remote server). For example, a single background task setting for an email application can control whether any agent of the email application is allowed to be executed in the background, or multiple background task settings for the email application can individually control whether individual background agents of the email application are executed in the background.

Utilizing background task settings to manage the execution of background tasks in a mobile device can be better understood by way of example. Consider system 300 in which application A has been operating in the foreground, agents 360-362 have been scheduled by application A, and background task setting 370 is set to indicate that agents of application A are not allowed to run in the background. When application A is pushed to the background, the operating system 310 reads the application A background task setting 370 and determines whether application A agents are allowed to run in the background. The operating system 310 determines that no application A tasks are allowed to run in the background, and suspends agents 360-362 or removes them from the scheduler 320. An operating system can suspend agents by modifying the corresponding entries in the scheduler to indicate that the agents are not scheduled for execution. Suspended agents can be revived if background task settings are later changed to indicate that agents for the appropriate application have been re-enabled. A suspended agent can be revived by its corresponding entry in the scheduler being modified to indicate that the agent is allowed to execute.

If background task setting 370 is set to indicate that application A agents are allowed to execute in the background, agents 360-362 can run in the background until background setting 370 is changed. Setting 370 can be changed by background task settings manager 330 in response to a user interacting with a background task setting control panel. If the manager 330 determines that there has been a change in the background task settings for application A, the manager 330 notifies the operating system 310 which triggers the operating system 310 to look to the scheduler 320 to see any application A agents are scheduled, and removes or suspends them. If setting 370 changes back to indicate that application A background agents are again allowed execute, the manager 330 again notifies the operating system 310 of the change to setting 370, and the operating system 310 revives any suspended agents scheduled by application A.

If application A is later moved from the background to the foreground, or re-opened after having been closed, operating system 310 reads application A background task settings 370 and 375 to determine whether application A agents can to execute in the background. If setting 375 is set to indicate that application A background tasks are to enabled when application A is moved back into the foreground or re-activated, the manager 330 sets setting 370 to indicate that application A agents can run in the background. Accordingly, any agents scheduled by application A while application A is operating in the foreground will remain scheduled if application A is later moved to the background. In some embodiments, suspended application A agents in the scheduler are revived when application A moves back into the foreground.

If settings 370 and 375 indicate that application A background tasks are disabled and are not to re-enabled when application A is moved back into the foreground or re-opened, application A is still allowed to schedule agents while application A is operating in the foreground, but these agents will be suspended or removed from the scheduler 320 when application A moves to the background Background task settings can be set via a user interacting with one or more background task setting control panels, which can be presented by the background task settings manager 330. These control panels can be presented to the user when an application that can schedule background agents is downloaded to or first executed on a mobile device, when a user accesses the device's system settings menu, or when the device has crossed any one of various operational thresholds (as described in greater detail below).

Figure 4:
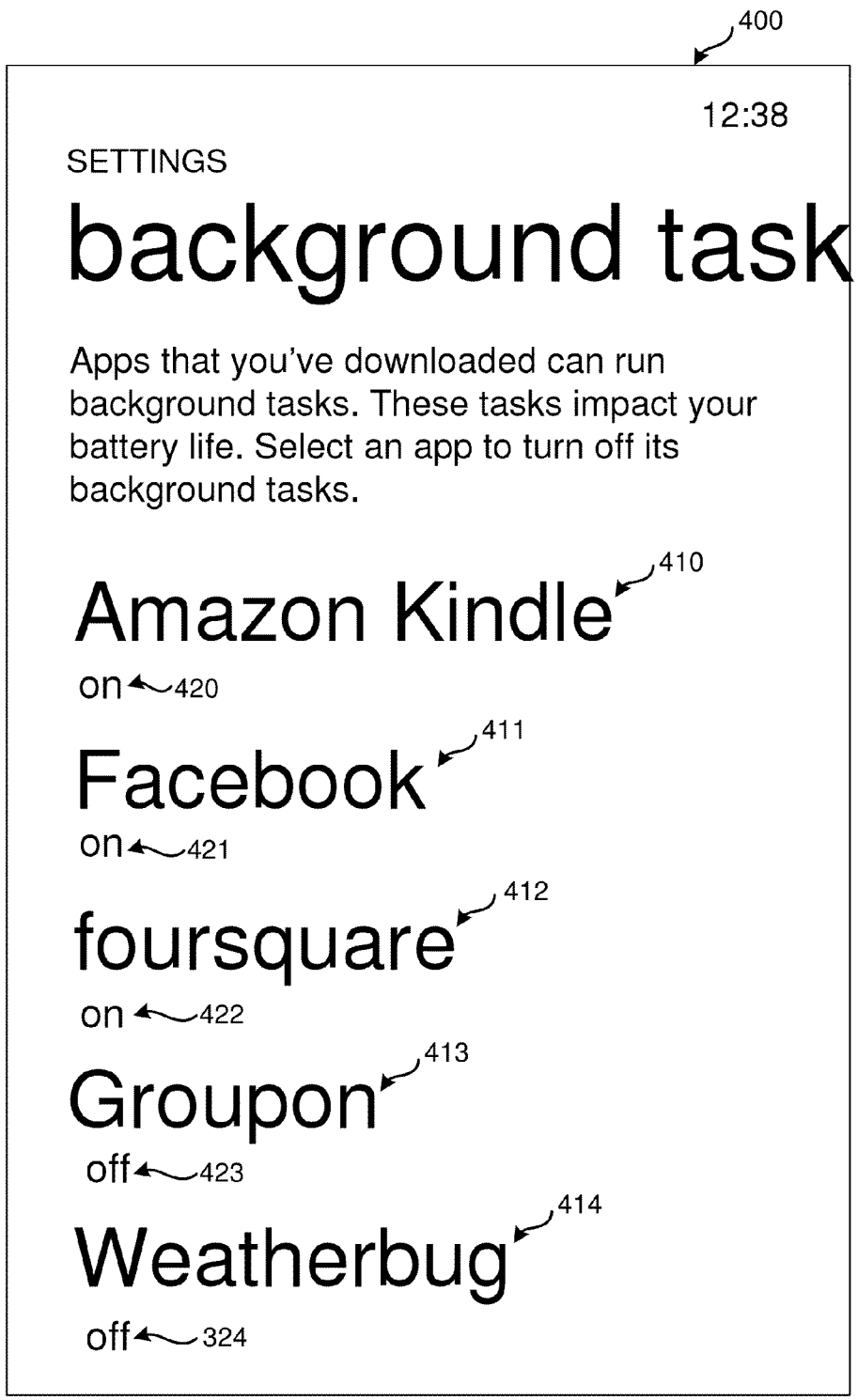
FIG. 4 is an illustration of an exemplary system-level background task control panel.

FIG. 4 is an illustration of an exemplary system-level background task control panel 400. The control panel 400 comprises a list of applications 410-414 that have the capability to schedule background agents, along with corresponding background task status indicators 420-424. The control panel 400 shows background tasks being enabled (background tasks are "on") for the Amazon® Kindle®, Facebook® and foursquare® applications 410-412 and background tasks not being enabled (background tasks are "off") for the Groupon® and Weatherbug® applications 413-414. A newly installed application can have its background tasks turned on or off by default, although background tasks of newly installed applications are generally disabled by default. In some embodiments of the control panel 400, the "on" and "off" background task indicators indicate whether background applications are currently executing. In some embodiments, control panel 400 can include buttons (e.g., "turn off all" and "turn on all" buttons) that disable or enable background tasks for applications capable of scheduling background tasks. A user can select an application name from the control panel 400 to see a brief description of that application's background functionality and to turn the application's background tasks on or off.

Figure 5:
FIG. 5 is an illustration of a first exemplary background task control panel for a specific application.

FIG. 5 is an illustration of a first exemplary background task control panel 500 for a specific application. The control panel 500 can be presented in response to a user having, for example, selected the Amazon® Kindle® application name 410 in control panel 400. Control panel 500 comprises a button 510 for disabling or turning off background tasks for a specific application, in this case, the Amazon® Kindle® application. Once the "turn off" button 510 is selected, any background agents associated with the specific application are suspended or are unscheduled (i.e., removed from the scheduler). The application can schedule agents the next time the application operates in the foreground, but as long as the background task setting for the application indicates that background tasks are turned off, these agents will be suspended or unscheduled when the application transitions back into the background. In some embodiments, the control panel 500 can further comprise a "turn on" button that enables or turns on the background task for an application.

Control panel 500 further comprises a message 520 indicating that applications not opened within two weeks will have their associated background tasks turned off. In some embodiments, the control panel 500 can allow a user to specify an inactivity period threshold. If the device determines that an application has not been executed in the foreground for a length of time that exceeds an inactivity period threshold, the device disables the application. The background task control panels can allow a user to specify an inactivity period threshold, for example, by allowing the user to select from among multiple inactivity period thresholds or by allowing a user to enter a custom inactivity period threshold. The control panels can be further configured to allow a user to specify inactivity period thresholds on a system-wide or application-by-application basis.

In some embodiments, the control panel 500 can comprise a list of individual background tasks that are currently executing or scheduled to execute that an application is capable of executing in the background. In such embodiments, the control panel 500 can comprise a button for each listed background task to allow a user to enable or disable background tasks on a task-by-task basis.

In some embodiments, the mobile device can be configured to allow for the disabling and enabling of background tasks by group across the applications. For example, a background task control panel can comprise a list of background task groups or types such as privacy-related tasks (e.g., tasks that broadcast device position), tasks related to the pulling and pushing of messages (e.g., tasks that check for new email, SMS (Short Message Service) or MMS (Multimedia Messaging Services) messages) and the like, and provide a single button for disabling or enabling all background tasks belonging to the group. In such embodiments, a user not desiring background applications to broadcast his or her location can disable all privacy-related tasks by selecting a single button.

In some embodiments, background task control panels can be configured to allow a user to modify the frequency at which background tasks are performed, on a system-wide (i.e., all applications), application or background task basis. For example, a user wanting to extend battery life but still wishing to have his or her mobile device periodically check for new email messages can reduce the frequency at which email application background agents operate.

Figure 6:
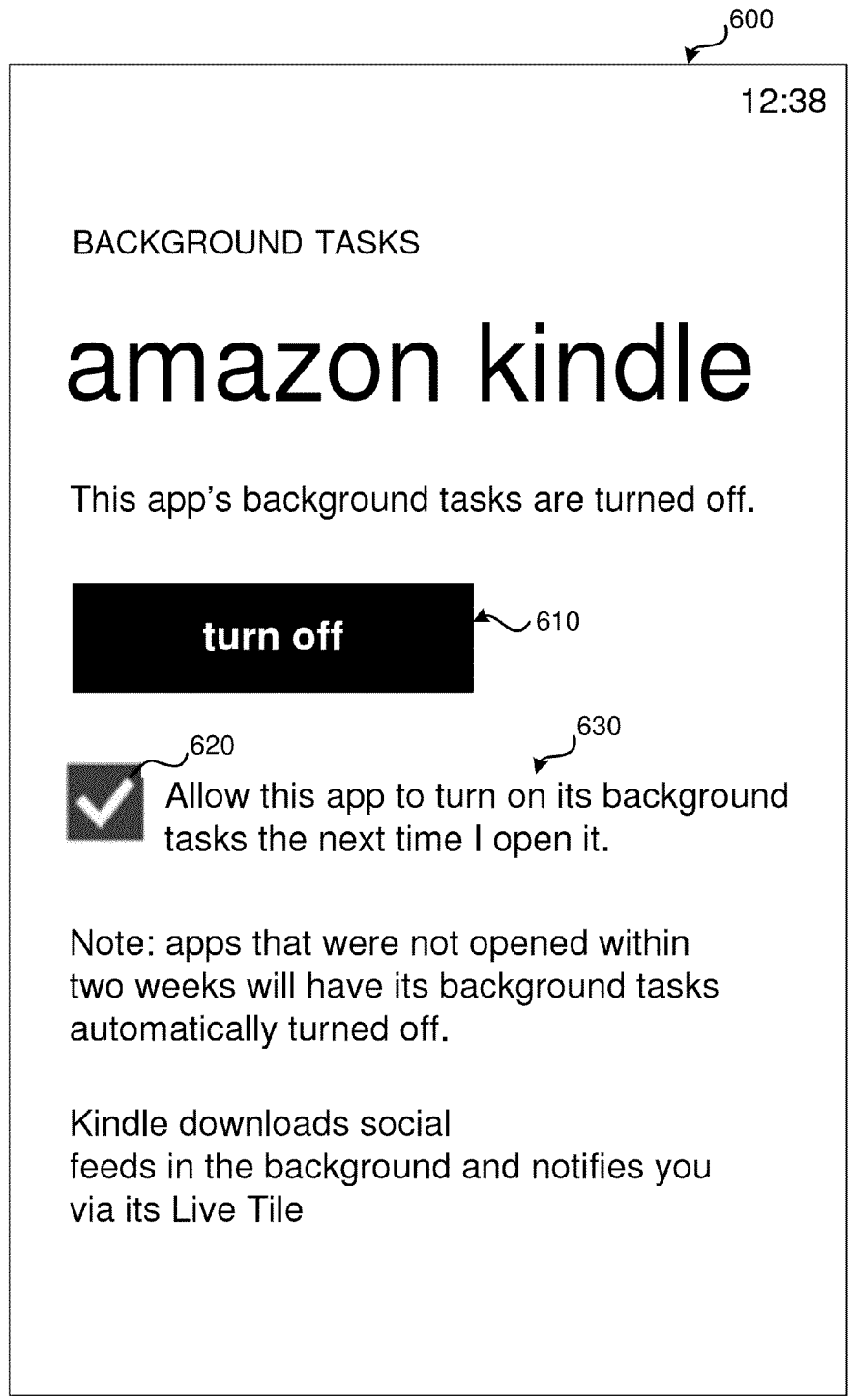
FIG. 6 is an illustration of a second exemplary background task control panel for a specific application.

FIG. 6 is an illustration of a second exemplary background task control panel 600 for a specific application. The control panel 600 comprises a selected turn-off button 610, indicating that background tasks for the Amazon® Kindle® application have been turned off. The control panel 600 further comprises a checkbox 620 and associated text 630. The checkbox 620 allows a user to indicate that background tasks for the Amazon® Kindle® application are to be re-enabled the next time the application is launched or moved back into the foreground. If the checkbox 620 is not checked, any tasks scheduled by the Amazon® Kindle® the next time it operates in the foreground will be suspended or unscheduled when the application moves back into the foreground. The checkbox 620 and text 630 can appear in response to the button 610 being selected. In some embodiments, background tasks associated with an application can be automatically enabled whenever an application is opened or brought back into the foreground, regardless of whether a user has disabled the background tasks.

Any of the background task control panels described herein can be accessed by the user navigating to the control panels from system-level menus or from within any individual application. For example, a user can navigate to a Facebook® background task control panel from within the Facebook® application.

Any of the mobile computing devices described herein can be configured to notify the user when certain events occur or when operational thresholds are crossed, and invite the user to navigate to an appropriate background task control panel in response. In some embodiments, the device can skip the user invitation and navigate directly to the appropriate background task control panel. Any background tasks turned off by the user in response to this notification can be automatically re-enabled by the device when the battery life exceeds the battery life threshold again when the threshold is again crossed or the condition no longer exists. For example, a user can be notified when the battery life of a device drops below a battery life threshold. In another example, a user can be notified when the power consumption rate of the mobile computing device crosses a power consumption rate threshold. In some embodiments, the device can monitor the power consumed by background agents and display this information to aid the user in deciding which background tasks to disable. In another example, the user can be notified upon the device detecting connection or disconnection of an external power supply or to a network.

Figure 7:
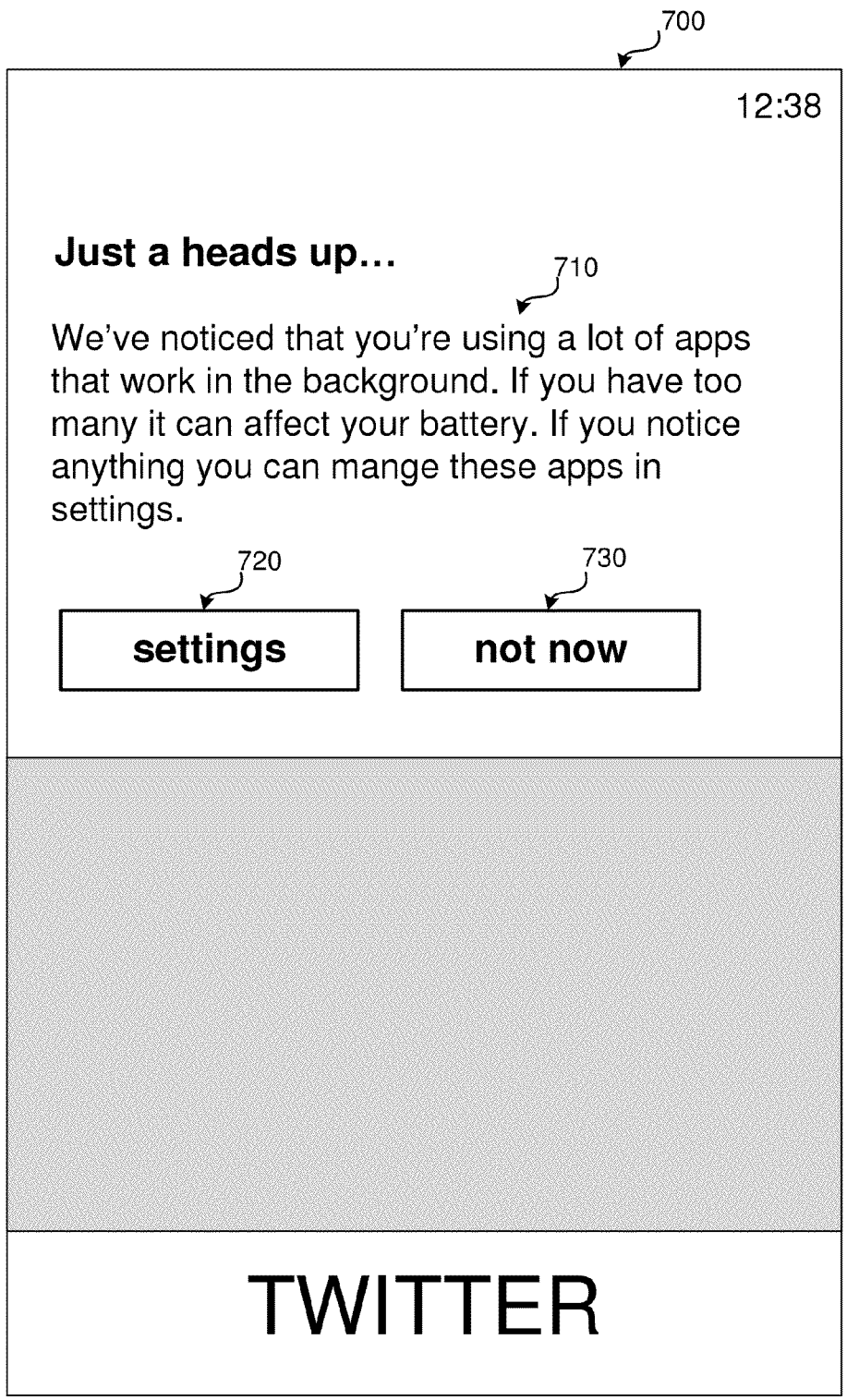
FIG. 7 is an illustration of an exemplary notification displayed in response to an application attempting to schedule an agent that would cause the number of scheduled agents to exceed a maximum scheduled agent threshold.

FIG. 7 is an illustration of an exemplary notification 700 displayed in response to an application attempting to schedule an agent that would cause the number of scheduled agents to exceed a maximum scheduled agent threshold. The notification 700 comprises a message 710 indicating that background tasks are not allowed for the current application (as doing so would cause the maximum scheduled agent threshold to be exceeded), a "settings" button 720 and a "not now" button 730. Selecting the "settings" button 720 takes the user to a system-level background task control panel (i.e., control panel 400), and selecting the "not now" button 730 dismisses the notification. After navigating to the background task settings control panel, the user can turn off background tasks for one or more applications, thereby reducing the scheduled agent count and allowing the application currently operating in the foreground to schedule a background agent.

In some embodiments, the user can be notified when the number of scheduled agents reaches a scheduled agent threshold that is less than the maximum scheduled agent threshold. Such a notification can be useful to inform the user that a given number of background tasks are currently running (the user may be unaware that any background tasks are running). For example, if the maximum scheduled agent count is 10, the user could be notified when the scheduled agent count exceeds, for example, two, four or six agents. These notifications can provide the user with an opportunity to disable background tasks prior to the scheduled agent count reaching the maximum scheduled agent threshold.

In some embodiments, a mobile computing device can automatically disable or enable background tasks. The device can automatically turn off one or more background tasks if, for example, the battery life drops below a battery life threshold, the device is disconnected from an external power supply or if the power consumption rate of the device exceeds a power consumption rate threshold. The device can automatically enable background tasks if the battery life exceeds the battery life threshold, if the power consumption rate drops below the power consumption rate threshold or if the device is reconnected to an external power supply. If less than all of the background tasks are turned off or turned on in response to an event, the device can turn off or turn on background tasks in an order dictated by a background task policy. For example, a background task policy can dictate that background tasks that consume greater amounts of power are turned off before background tasks consuming lower amounts of power. In some embodiments, the mobile computing device can automatically adjust the frequency at which background tasks operate rather than turning on or turning off background task to reduce power consumption.

In some embodiments, a mobile computing device can enable or disable background tasks based on how often an application is executed. A mobile device can be configured to enable background tasks of an application having a usage that exceeds a first usage threshold or to disable background tasks of an application having a usage below a second usage threshold. These usage thresholds can be fixed thresholds that cannot be changed, or set to initial default values that can be modified by a user.

In some embodiments, the mobile computing device saves the current background task settings when the device is turned off. The background task settings can be saved separately from, or as part of, a user profile. The background task settings can be stored locally at the device, or remotely at, for example, a cloud-based service. Locally stored background task settings can be loaded when the user logs back into the mobile computing device, or whenever the mobile computing device is next turned on, regardless of who is operating the mobile device. Storing background task settings at a cloud-based service allows a user to carry over background device settings from one mobile device to another (e.g., from a first smartphone to a second smartphone, a laptop computer, tablet computer, etc.).

In some embodiments, turning off background tasks can be part of a general power saving mode of a mobile computing device. Thus, when a device enters the power savings mode, the device can automatically disable all background tasks.

Figure 8:
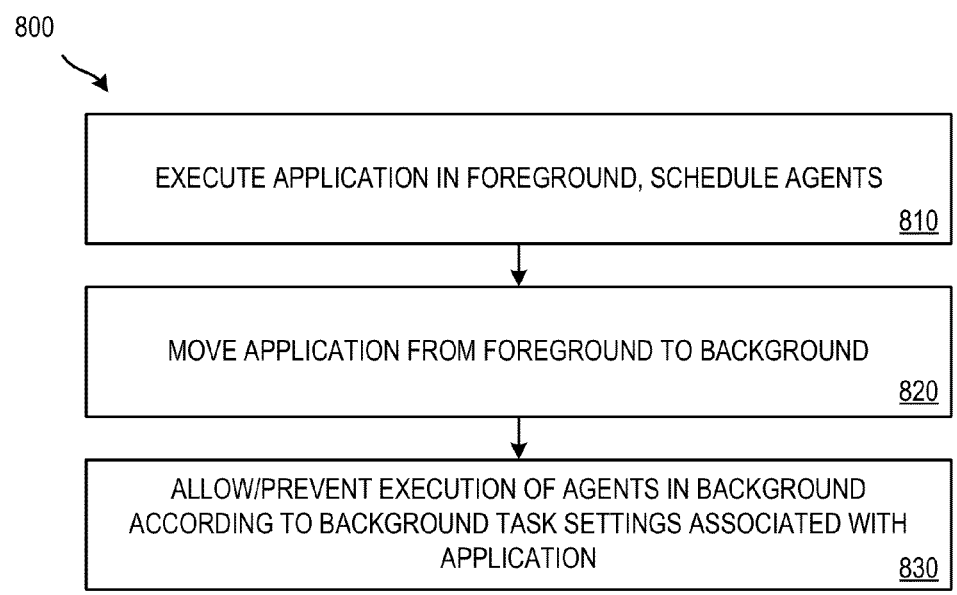
FIG. 8 is a flowchart of a first exemplary method of managing background agents in a multitasking mobile computing device.

FIG. 8 is a flowchart of a first exemplary method 800 of managing background agents in a multitasking mobile computing device. The method 800 can be performed by a smartphone storing social networking and web browser applications. At 810, an application executes in the foreground of a mobile computing device. The execution comprises scheduling one or more agents of the application for execution by the mobile computing device. In the example, the smartphone executes the social network application in the foreground and as part of executing the social network application, an agent is scheduled to check-in with a cloud-based service associated with the social media application. At 820, the application is moved from the foreground of the mobile computing device to the background of the mobile computing device. In the example, in response to a user launching the web browser application, the smartphone moves the social media application from the foreground to the background. At 830, the mobile computing device allows or prevents execution of the scheduled one or more agents of the application according to one or more background task setting associated with the application. In the example, background execution of the social networking application agent that checks in with the cloud-based service is allowed or prevented according to a background task setting associated with the social networking application.

The method 800 can further comprise receiving, via a background task control panel presented at a display of the mobile computing device, an indication to allow or prevent execution of agents associated with the application in the background of the mobile computing device, and setting the one or more background task setting according to the received indication. In the example, the smartphone can receive, via a background task control panel presented on the smartphone display, an indication to allow background agents of the social networking application to run in the background of the smartphone, and to set social networking application background task settings accordingly.

Figure 9:
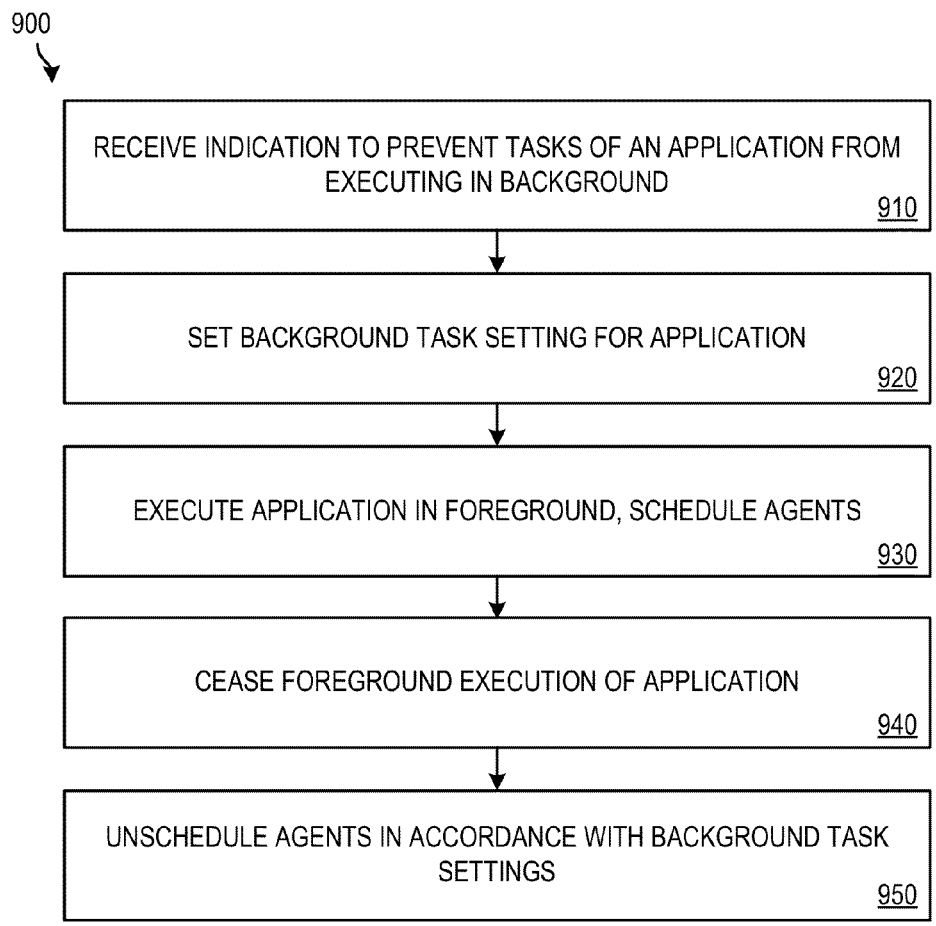
FIG. 9 is a flowchart of a second exemplary method of managing background agents in a multitasking mobile computing device.

FIG. 9 is a flowchart of a second exemplary method 900 of managing background agents on a multitasking mobile computing device. The method 900 can be performed by a tablet computer storing email and social media applications. At 910, user input at the mobile computing device indicating that agents associated with an application are to be prevented from executing in the background of the mobile computing device is received. In the example, a tablet user brings up a background task control panel for the social media application and supplies user input indicating that background tasks for the social media application are to be turned off and that the background tasks are not to be turned on the next time the social media application is opened. At 920, one or more background task settings associated with the application are set according to the received indication. In the example, background task settings for the social media application are set to indicate that background tasks for the social media application are turned off and that background tasks for the application are not to be turned on when the application is next launched.

At 930, the application is executed in the foreground of the mobile computing device. Execution comprises scheduling one or more agents of the applications for execution by the mobile computing device. The scheduling comprises adding the one or more agents to a scheduler. In the example, the social media application is executed by the tablet computer and the social media application schedules an agent to periodically access a cloud-based social media server associated with the social media application to check for new messages from the server. The table schedules the agent by adding it to a scheduler. The scheduled agent runs while the social media application is operating in the foreground as the agent is not operating as a background task. At 940, the application is moved from the foreground of the mobile computing device to the background of the mobile computing device. In the example, the user executes the email application, which causes the social media application to be moved from the foreground to the background. At 950, the scheduled one or more agents of the application are removed from the scheduler in accordance with the one or more background task settings associated with the application. In the example, the social media application agent scheduled to periodically check in with the social media server is removed from the scheduler in accordance with the social media background task settings.

Any of the computer-executable instructions (mobile computing device-executable instructions) for implementing the disclosed techniques as well as any data created and used during implementation of the disclosed embodiments can be stored on one or more computer-readable media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smartphones or other mobile computing devices that include computing hardware). Computer-readable media does not include propagated signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods, apparatuses and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatuses can be used in conjunction with other systems, methods and apparatuses.

Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Having illustrated and described the principles of the illustrated embodiments, the embodiments can be modified in various arrangements while still remaining faithful to the concepts described above. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of managing the execution of background tasks on a computing device, the method comprising:

executing an application in a foreground of the computing device, the executing comprising scheduling one or more tasks of the application for execution by the computing device;

moving the application from the foreground of the computing device to a background of the computing device; and while the application continues to operate in the background of the computing device, allowing or preventing execution of the scheduled one or more tasks of the application according to one or more background task settings associated with the application.

2. The method of claim 1, the method further comprising:
receiving, via a background task control panel presented at a display of the computing device, an indication to allow or prevent execution of the scheduled one or more tasks of the application in the background of the computing device; and
setting the one or more background task settings according to the received indication.

3. The method of claim 2, wherein the one or more background task settings indicate that the scheduled one or more tasks of the application are to be prevented from executing in the background of the computing device.

4. The method of claim 2, wherein the one or more background task settings indicate that the scheduled one or more tasks of the application are to be allowed to execute in the background of the computing device.

5. The method of claim 2, wherein the application is one of one or more applications, the background task control panel comprising a list of the one or more applications, the list comprising a background task status indicator for at least one of the one or more applications.

6. The method of claim 2, wherein the background task control panel is presented in response to determining that a number of tasks scheduled for execution by the computing device exceeds a scheduled agent threshold.

7. The method of claim 2, wherein the background task control panel is presented in response to determining that the scheduled one or more tasks of the application would cause a number of tasks scheduled for execution by the computing device to exceed a maximum scheduled agent threshold.

8. The method of claim 2, wherein the background task control panel is presented in response to determining that a battery life of the computing device has dropped below a battery life threshold or a power consumption rate of the computing device exceeds a power consumption rate threshold.

9. The method of claim 1, wherein the allowing or preventing execution of the scheduled one or more tasks of the application in the background of the computing device comprises suspending the scheduled one or more tasks of the application.

10. The method of claim 1, wherein the allowing or preventing execution of the scheduled one or more tasks of the application in the background of the computing device comprises unscheduling the scheduled one or more tasks of the application.

11. The method of claim 1, further comprising:
determining that a length of time over which the application has not been executed in the foreground of the computing device exceeds an inactivity period threshold; and
upon determining that the inactivity period threshold has been exceeded, setting the one or more background task settings associated with the application to prevent the scheduled one or more tasks of the application from executing in the background of the computing device.

12. The method of claim 1, further comprising the computing device automatically setting the one or more background task settings associated with the application in response to an event.

13. The method of claim 12, wherein the event comprises detecting a battery life of the computing device crossing a battery life threshold.

14. The method of claim 12, wherein the event comprises detecting a power consumption rate of the computing device crossing a power consumption rate threshold.

15. The method of claim 12, wherein the event comprises detecting the computing device connecting to or disconnecting from an external power supply.

16. The method of claim 1, wherein the moving the application from the foreground of the computing device to the background of the computing device occurs in response to launching a second application.

17. One or more computing device-readable media storing computing device-executable instructions for causing a computing device to perform operations, the operations comprising:
executing an application in a foreground of the computing device, the executing comprising scheduling one or more tasks of the application for execution by the computing device;
moving the application from the foreground of the computing device to a background of the computing device; and
while the application continues to operate in the background of the computing device, preventing execution of the scheduled one or more tasks of the application according to a background task setting associated with the application.

18. The one or more computing device-readable media of claim 17, the operations further comprising:
receiving, via a background task control panel presented at a display of the computing device, an indication to allow or prevent execution of the scheduled one or more tasks of the application in the background of the computing device; and
setting the background task setting according to the received indication.

19. The one or more computing device-readable media of claim 17, the operations further comprising the computing device automatically setting the background task setting associated with the application in response to detecting a battery life of the computing device crossing a battery life threshold, detecting a power consumption rate of the computing device crossing a power consumption rate threshold or detecting disconnection of the computing device from an external power supply.

20. At least one computing device programmed to carry out operations, the operations comprising:
receiving user input at the computing device indicating that one or more tasks of an application are to be allowed to execute in a background of the computing device;
setting one or more background task settings associated with the application according to the received user input;
executing the application in a foreground of the computing device, the executing comprising scheduling the one or more tasks of the application for execution by the computing device, the scheduling comprising adding the one or more tasks of the application to a scheduler;
moving the application from the foreground of the computing device to the background of the computing device;
determining that a length of time over which the application has not been executed in the foreground of the computing device exceeds an inactivity period threshold; and
upon determining that the inactivity period threshold has been exceeded:
setting the one or more background task settings associated with the application to prevent the scheduled one or more tasks of the application from executing in the background of the computing device; and while the application continues to operate in the background of the computing device, removing the scheduled one or more tasks of the application from the scheduler in accordance with the one or more background task settings associated with the application.

* * * * *